(12) United States Patent
Suh et al.

(10) Patent No.: US 8,588,318 B2
(45) Date of Patent: Nov. 19, 2013

(54) METHOD FOR DEMODULATING SIGNAL AND TERMINAL AND BASE STATION FOR EXECUTING THE METHOD

(75) Inventors: Jung Hoon Suh, Suwon-si (KR); Sung Jin Kim, Suwon-si (KR); David J. Love, West Lafayette, IN (US)

(73) Assignees: Samsung Electronics Co., Ltd., Suwon-si (KR); Purdue Research Foundation, West Lafayette, IN (US)

( * ) Notice: Subject to any disclaimer, the term of this patent is extended or adjusted under 35 U.S.C. 154(b) by 862 days.

(21) Appl. No.: 12/202,385

(22) Filed: Sep. 1, 2008

(65) Prior Publication Data

US 2010/0054351 A1 Mar. 4, 2010

(51) Int. Cl.
*H04L 1/02* (2006.01)
*H04B 7/02* (2006.01)

(52) U.S. Cl.
USPC .......................................... 375/267; 375/316

(58) Field of Classification Search
USPC .................................. 375/260, 267, 295, 316
See application file for complete search history.

(56) References Cited

U.S. PATENT DOCUMENTS

| 2006/0193294 | A1* | 8/2006 | Jorswieck et al. | 370/334 |
| 2007/0058741 | A1* | 3/2007 | Inagawa | 375/260 |
| 2008/0125045 | A1* | 5/2008 | Nakao | 455/42 |
| 2008/0317158 | A1* | 12/2008 | Ketchum et al. | 375/267 |

* cited by examiner

*Primary Examiner* — Chieh M Fan
*Assistant Examiner* — Freshteh N Aghdam
(74) *Attorney, Agent, or Firm* — NSIP Law

(57) ABSTRACT

A method of modulating and/or demodulating a signal in a communication system and a terminal for demodulating a signal received from a base station are provided. A terminal includes a singular value extractor to extract at least one singular value of a channel matrix associated with a channel that is formed between a base station and the terminal, a modulation order determination unit to determine a modulation order based on the at least one singular value, and a received signal demodulator to demodulate a received signal according to the determined modulation order.

13 Claims, 9 Drawing Sheets

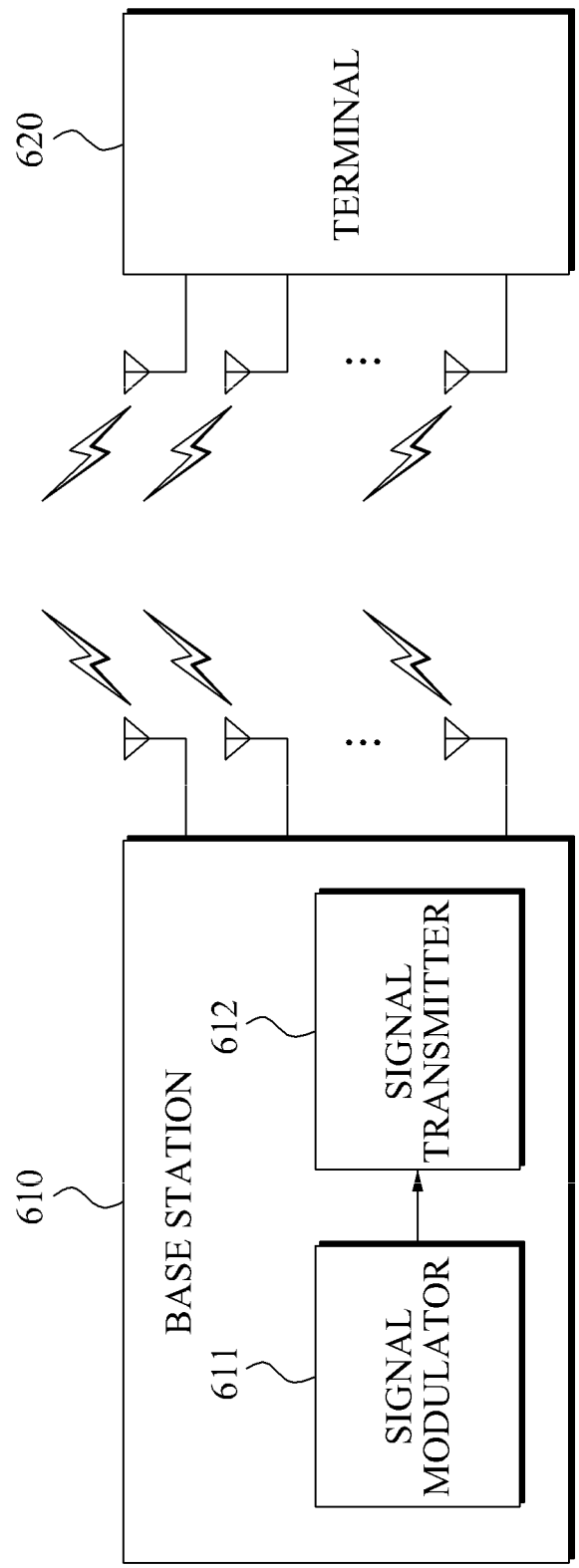

METHOD FOR DEMODULATING SIGNAL AND TERMINAL AND BASE STATION FOR EXECUTING THE METHOD

TECHNICAL FIELD

The following description relates to a method of modulating and/or demodulating a signal in a communication system, and more particularly, to a method of determining a modulation order, by a terminal, of a modulated signal transmitted from a base station in a multiple-input multiple-output (MIMO) system to demodulate the modulated signal.

BACKGROUND

A number of researches are being conducted to provide various types of multimedia services including voice services and to support the high quality and high speed of data transmission in a wireless communication environment. Technologies associated with a multiple-input multiple-output (MIMO) system using multiple channels, are also in rapid development.

An adaptive modulation scheme is widely used in a MIMO system. According to the adaptive modulation scheme, a modulation scheme may be changed as required according to a radio wave state in a wireless channel, for example, reception power, fading, interference, and the like, to thereby achieve a maximum possible data rate. Where a base station modulates a signal according to the adaptive modulation scheme to transmit the modulated signal to a terminal, the terminal may receive and demodulate the modulated signal. Generally, a signal transmitted from the base station may be different from a signal finally received by the terminal due to various interference elements such as noise and the like occurring during a transmission process. Specifically, the signal finally received by the terminal may be varied from the original signal. Accordingly, the terminal may predict a transmission symbol to be transmitted from the base station based on a received symbol, and may reduce a symbol error rate (SER) through a scheme of determining an accurately received symbol to be received where the transmission symbol is errorlessly transmitted.

In order to estimate the transmission symbol based on the received symbol, it may be desirable to determine a modulation order of the signal transmitted from the base station. In particular, the modulation order may vary depending on circumstances in a system using the adaptive modulation scheme and may be an important factor to predict the transmission symbol. Accordingly, there is a need for a method of determining a modulation order.

SUMMARY

In one general aspect, a terminal includes a singular value extractor to extract at least one singular value of a channel matrix associated with a channel that is formed between a base station and the terminal, a modulation order determination unit to determine a modulation order based on the at least one singular value, and a received signal demodulator to demodulate a received signal according to the determined modulation order.

The modulation order determination unit may comprise a singular value selector to select a minimum singular value from the at least one singular value, a distance calculator to calculate an Euclidian distance between at least two transmission symbols based on an Euclidian distance between at least two received symbols and the selected minimum singular value, wherein the at least two received symbols are different from each other, and a determination unit to compare the Euclidian distance between the at least two transmission symbols with a reference value to determine the modulation order.

The at least two received symbols may be symbols with a minimum Euclidian distance interval.

The distance calculator may divide a minimum squared Euclidian distance between the at least two received symbols by the square of the minimum singular value to calculate a minimum squared Euclidian distance between the at least two transmission symbols.

The received signal from base station may be a signal transmitted using an adaptive modulation scheme.

The received signal demodulator may comprise a transmission symbol detector to detect transmission symbols corresponding to received symbols using a maximum likelihood scheme, based on the determined modulation order, and a received symbol determination unit to determine an accurate received symbol corresponding to each of the detected transmission symbols.

The terminal may communicate with the base station in a multiple-input multiple-output (MIMO) communication system.

In another general aspect, a base station for forming a channel with a terminal and providing a signal to the terminal in which at least one singular value of a channel matrix associated with the channel is extracted from the signal to determine a modulation order and demodulate the signal based on the determined modulation order, includes a signal modulator to modulate a transmission signal according to an adaptive modulation scheme based on a channel state of the channel that is formed between the base station and the terminal, and a signal transmitter to transmit the modulated signal to the terminal.

In still another general aspect, a method of demodulating a received signal by a terminal, includes extracting at least one singular value of a channel matrix associated with a channel that is formed between a base station and the terminal, determining a modulation order based on the at least one singular value, and demodulating the received signal according to the determined modulation order.

The determining of the modulation order may comprise selecting a minimum singular value from the at least one singular value, calculating an Euclidian distance between at least two transmission symbols based on an Euclidian distance between at least two received symbols and the minimum singular value, wherein the at least two received symbols are different from each other, and comparing the Euclidian distance between the at least two transmission symbols with a reference value to determine the modulation order.

The at least two received symbols may be symbols with a minimum Euclidian distance interval.

The calculating of the Euclidian distance may comprise dividing a minimum squared Euclidian distance between the at least two received symbols by the square of the minimum singular value to calculate a minimum squared Euclidian distance between the at least two transmission symbols.

The received signal from the base station may be a signal transmitted using an adaptive modulation scheme.

The demodulating of the received signal may comprise detecting transmission symbols corresponding to received symbols using a maximum likelihood scheme, based on the determined modulation order, and determining an accurate received symbol corresponding to each of the detected transmission symbols.

The terminal may communicate with the base station in a multiple-input multiple-output (MIMO) communication system.

In yet another general aspect, there is provided a method and system in which a terminal receives a modulated signal from a base station to determine a modulation order of the modulated signal and demodulate the modulated signal. An error occurring in a signal transmission process may be reduced.

Other features will become apparent to those skilled in the art from the following detailed description, which, taken in conjunction with the attached drawings, discloses exemplary embodiments of the invention.

BRIEF DESCRIPTION OF THE DRAWINGS

FIG. 6 is a diagram illustrating a configuration of a base station according to an exemplary embodiment.

Throughout the drawings and the detailed description, unless otherwise described, the same drawing reference numerals will be understood to refer to the same elements, features, and structures.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses, and/or methods described herein will be suggested to those of ordinary skill in the art. Also, description of well-known functions and constructions are omitted to increase clarity and conciseness.

Figure 1:
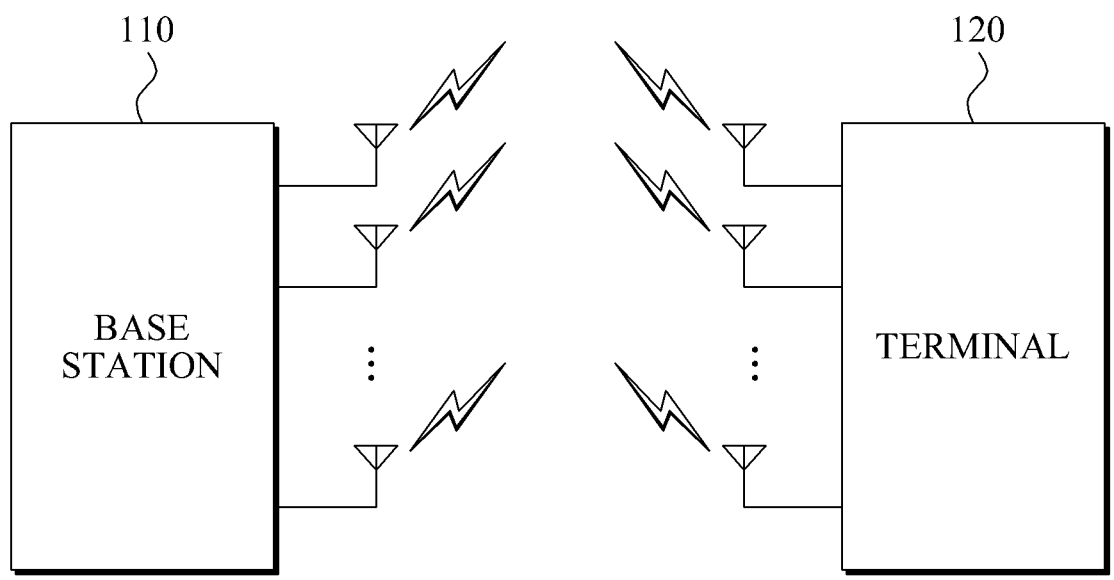
FIG. 1 is a diagram illustrating a base station and a terminal in a multiple-input multiple-output (MIMO) system according to an exemplary embodiment.

FIG. 1 illustrates a base station 110 and a terminal 120 in a multiple-input multiple-output (MIMO) system according to an exemplary embodiment.

As illustrated in FIG. 1, the MIMO system comprises the base station 110 and the terminal 120.

A plurality of transmit antennas may be installed in the base station 110. A plurality of receive antennas may be installed in the terminal 120. Herein, it is assumed that a number of transmit antennas of the base station 110 is $N_T$ and a number of receive antennas of the terminal 120 is $N_R$. The relationship between a symbol transmitted from the base station 110 and a symbol received by the terminal 120 may be expressed as, $$Y = \sqrt{\frac{E_s}{N_R}} HS + W, \qquad \text{[Equation 1]}$$

where H is a channel matrix, Y is a receive symbol vector of row $N_R$ column 1, S is a transmit symbol vector where $S=[s_1, s_2, \ldots, s_{N_T}]^T$, W is an additive white Gaussian noise (AWGN) with normal distribution CN(0, 1), and Es is a total signal energy of the base station 110. In this case, the transmit symbol vector S may satisfy the following Equation 2, $$tr(E\{SS^H\})=N_R. \qquad \text{[Equation 2]}$$

As shown in the above Equation 1, the receive symbol vector Y received by the terminal 120 may include noise occurring while the transmit symbol vector S is being transmitted via the channel H.

According to an aspect, the base station 110 may adaptively modulate a transmission signal and transmit the modulated signal to the terminal 120. The base station 110 may perform, for example, a quadrature amplitude modulation (QAM) for a signal to transmit the modulated signal to the terminal 120. In this instance, the base station 110 may adopt the adaptive modulation scheme that changes a modulation order to 4 QAM, 16 QAM, 64 QAM, and the like, according to a radio wave state such as reception power, fading, interference, and the like. Generally, when performing the QAM for the transmission signal, a transmission symbol may be mapped on a QAM constellation, which may be expressed as, $$s_i = a_I + ja_Q, \text{ where } i = 1, \ldots, N_T, \qquad \text{[Equation 3]}$$

$$a_I, a_Q \in \left\{ \pm \frac{1}{d}, \pm \frac{3}{d}, \ldots, \pm \frac{\sqrt{M}-1}{d} \right\}.$$

In the case of 4 QAM, d may be $\sqrt{2}$. In the case of 16 QAM, d may be $\sqrt{10}$. In the case of 64 QAM, d may be $\sqrt{42}$.

Where the base station 110 adaptively modulates the transmission signal and transmits the modulated signal to the terminal 120, the terminal 120 may receive received symbol Y according to the above Equation 1 and calculate a minimum Euclidian distance of transmission symbol S on the constellation based on a minimum Euclidian distance of the receive symbol Y on the constellation. The terminal 120 may compare the minimum Euclidian distance of the transmission symbol S on the constellation with a minimum Euclidian distance between transmission symbols shown in the above Equation 3 to determine a modulation order in which the base station 110 modulates the transmission signal.

The minimum squared Euclidian distance of the received symbol Y on the constellation may be induced from the following Equation 4, $$d^2_{min,SM} = \min_{s_i \neq s_j} \{\|H(S_i - S_j)\|^2 : S_{i,l} \neq S_{j,l}, l = 1, \ldots, N_T\}. \qquad \text{[Equation 4]}$$

The terminal 120 may calculate the squared Euclidian distance between two received symbols with the minimum Euclidian distance interval, based on the above Equation 4.

When using the squared Euclidian distance between the two received symbols with the minimum Euclidian distance interval and a minimum singular value among singular values of the channel matrix H of the MIMO system, it may be possible to calculate the minimum squared Euclidian distance of the transmission symbol.

The minimum squared Euclidian distance of the transmission symbol may be calculated according to the following Equation 5, $$d_{min,sm}^2 = \min_{s_i, s_j \in S_{SM}} \{\|S_i - S_j\|^2 : S_{i,l} \neq S_{j,l}, l = 1, \ldots, N_T\}.$$ [Equation 5]

Equation 5 expresses the squared Euclidian distance between two transmission symbols with the minimum Euclidian distance interval among at least two transmission symbols. The relationship among the minimum squared Euclidian distance between the transmission symbols, the minimum squared Euclidian distance between the received symbols, and the minimum singular value of the channel matrix H of the MIMO system may be expressed as, $$d_{min,SM}^2 \geq \lambda_L^2 d_{min,sm}^2,$$ [Equation 6]

where $$d_{min,SM}^2$$

is the minimum squared Euclidian distance between the received symbols, $$\lambda_L^2$$

is the minimum squared singular value of the channel matrix H of the MIMO system, and $$d_{min,sm}^2$$

is the minimum squared Euclidian distance between the transmission symbols.

The terminal 120 may perform a singular value decomposition (SVD) for a channel matrix between the base station 110 and the terminal 120, and extract a minimum singular value from singular values.

As described above, the terminal 120 may calculate the minimum squared Euclidian distance between the received symbols and the minimum singular value of the channel matrix. Therefore, the terminal 120 may also calculate the minimum squared Euclidian distance between the transmission symbols using the Equation 6. More specifically, the quotient that is obtained by dividing the minimum squared Euclidian distance between the received symbols by the square of the minimum singular value of the channel matrix may be greater than or equal to the minimum squared Euclidian distance between the transmission symbols. In this case, the minimum squared Euclidian distance between the transmission symbols may be selected as the quotient that is obtained by dividing the minimum squared Euclidian distance between the received symbols by the square of the minimum singular value of the channel matrix.

The terminal 120 may compare the minimum squared Euclidian distance between the transmission symbols, calculated according to Equation 6, with the minimum squared Euclidian distance of the transmission symbols on the constellation allocated for each modulation scheme in the above Equation 3. Through this, the terminal 120 may determine the modulation order selected by the base station 110.

Figure 2:
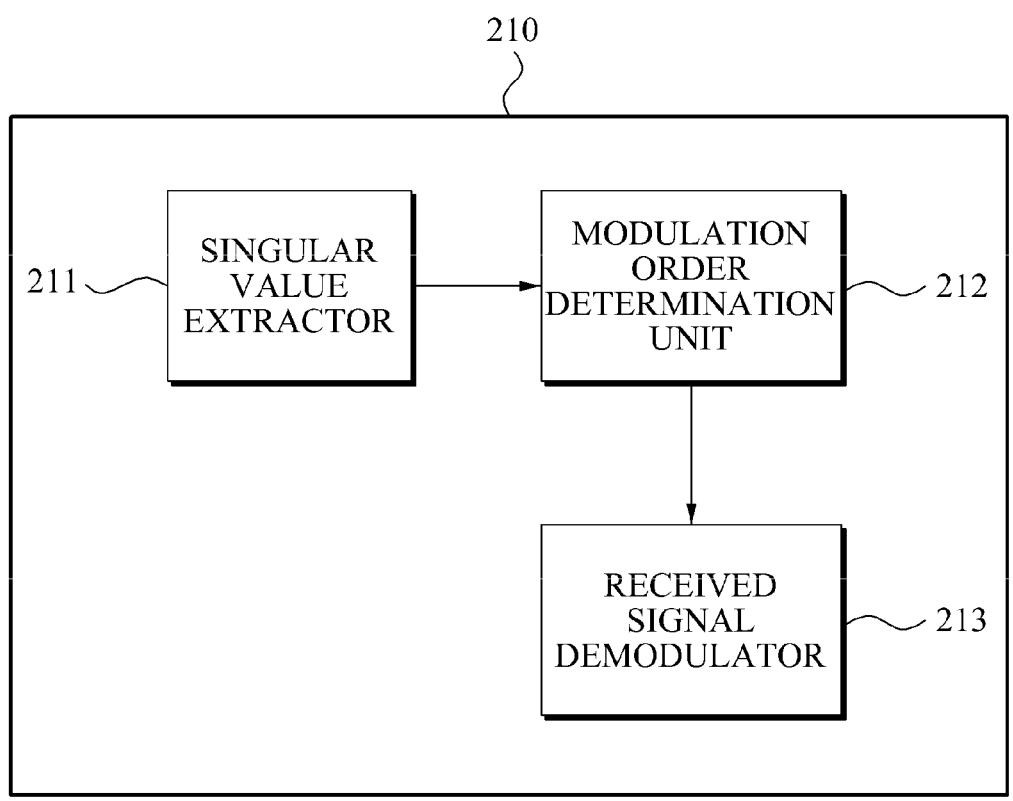
FIG. 2 is a block diagram illustrating a configuration of a terminal according to an exemplary embodiment.

FIG. 2 illustrates a configuration of a terminal 210 according to an exemplary embodiment.

As illustrated in FIG. 2, the terminal 210 comprises a singular value extractor 211, a modulation order determination unit 212, and a received signal demodulator 213.

The singular value extractor 211 may perform an SVD for a channel matrix associated with a channel that is formed between a base station and the terminal 210 to extract at least one singular value.

Figure 3:
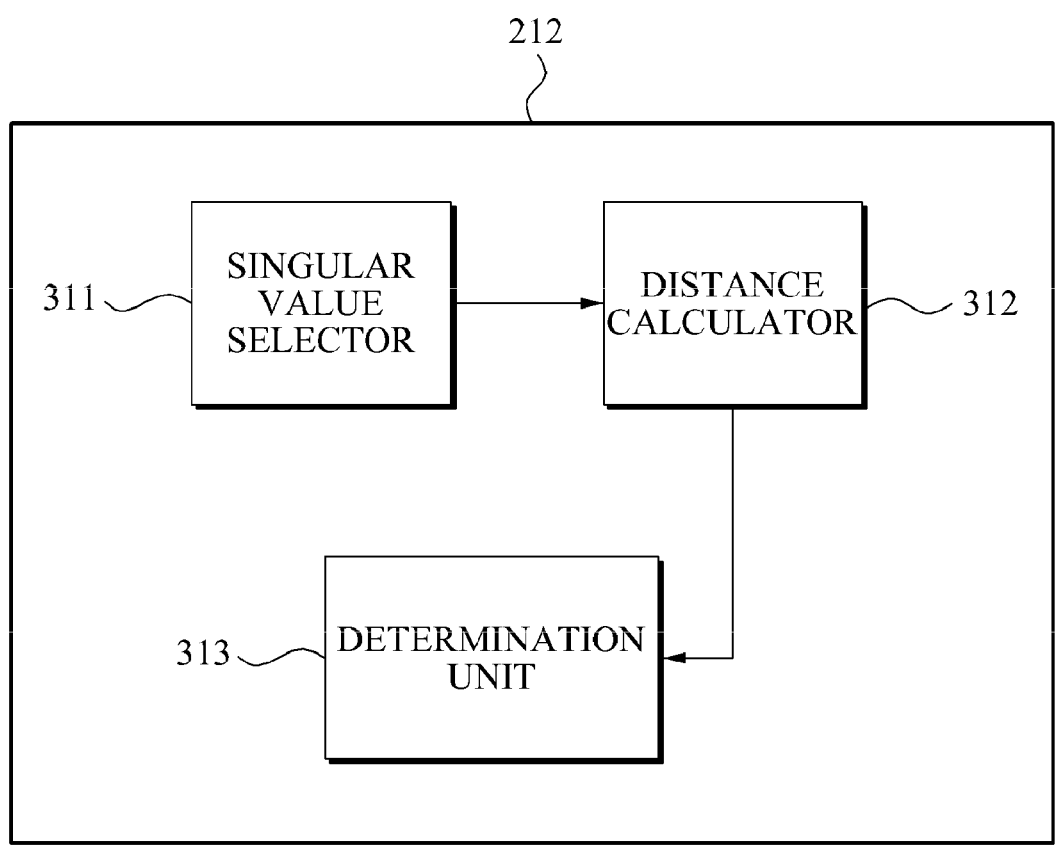
FIG. 3 is a block diagram illustrating a configuration of a modulation order determination unit shown in FIG. 2 according to an exemplary embodiment.

The modulation order determination unit 212 may determine a modulation order based on the extracted at least one singular value. The modulation order determination unit 212 may include a singular value selector 311, a distance calculator 312, and a determination unit 313 as shown in FIG. 3. Therefore, the configuration of the modulation order determination unit 212 will be described with reference to FIG. 3.

FIG. 3 illustrates the configuration of the modulation order determination unit 212 of FIG. 2.

As illustrated in FIG. 3, the modulation order determination unit 310 comprises the singular value selector 311, the distance calculator 312, and the determination unit 313.

The singular value selector 311 may select a minimum singular value from the extracted at least one singular value.

The distance calculator 312 may calculate a minimum squared Euclidian distance between at least two received symbols with a minimum Euclidian distance interval, based on the above Equation 4. The distance calculator 312 may obtain the quotient by dividing the minimum squared Euclidian distance between the received symbols by the square of the selected minimum singular value. The obtained quotient may be the minimum squared Euclidian distance between the transmission symbols shown in the above Equation 5.

The determination unit 313 may compare the calculated minimum squared Euclidian distance between the at least two transmission symbols with a reference value to determine a modulation order. In this case, the reference value may denote the minimum squared Euclidian distance between the transmission symbols for each modulation order shown in the above Equation 3.

Hereinafter, the received signal demodulator 213 will be described with reference to FIG. 2. The received signal demodulator 213 may demodulate the received signal according to the determined modulation order.

Figure 4:
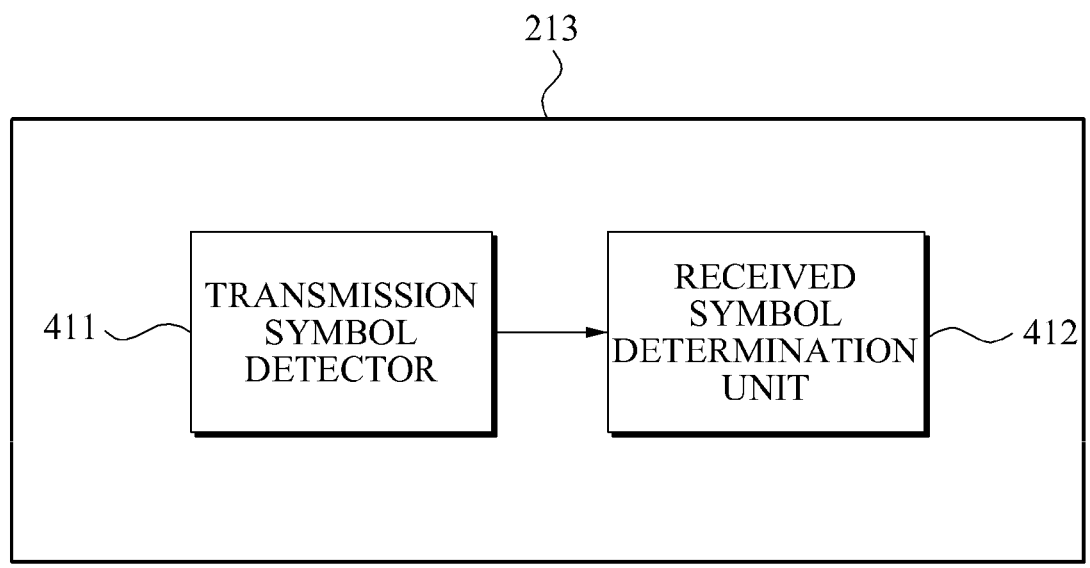
FIG. 4 is a block diagram illustrating a configuration of a received signal demodulator shown in FIG. 2 according to an exemplary embodiment.

The received signal demodulator 213 may include a transmission symbol detector 411 and a received symbol determination unit 412 as shown in FIG. 4. Hereinafter, the configuration of the received signal demodulator 213 will be described with reference to FIG. 4.

FIG. 4 illustrates the configuration of the received signal demodulator 213 of FIG. 2.

As illustrated in FIG. 4, the received signal demodulator 410 comprises a transmission symbol detector 411 and a received symbol determination unit 412.

According to an aspect, the transmission symbol detector 411 may detect transmission symbols corresponding to received symbols using a maximum likelihood, based on a modulation order determined by a terminal. The maximum likelihood may be represented as, $$\hat{S} = \arg\min_{s \in S_{SM}} \left\| Y - \sqrt{\frac{E_s}{N_R}} HS \right\|^2, \quad \text{[Equation 7]}$$

where Y is a receive symbol vector received by the terminal, $N_R$ is a number of antennas installed in the terminal, $E_S$ is the entire energy of the base station, H is a channel matrix associated with a channel formed between the base station and the terminal, and S is a transmit symbol vector.

The transmission symbol detector 411 may detect a transmission symbol, using the above Equation 7.

Where the transmission symbol errorlessly passes through the channel, the received symbol determination unit 412 may determine an accurate received symbol that may be received by the terminal, based on the detected transmission symbol.

Figure 5A:
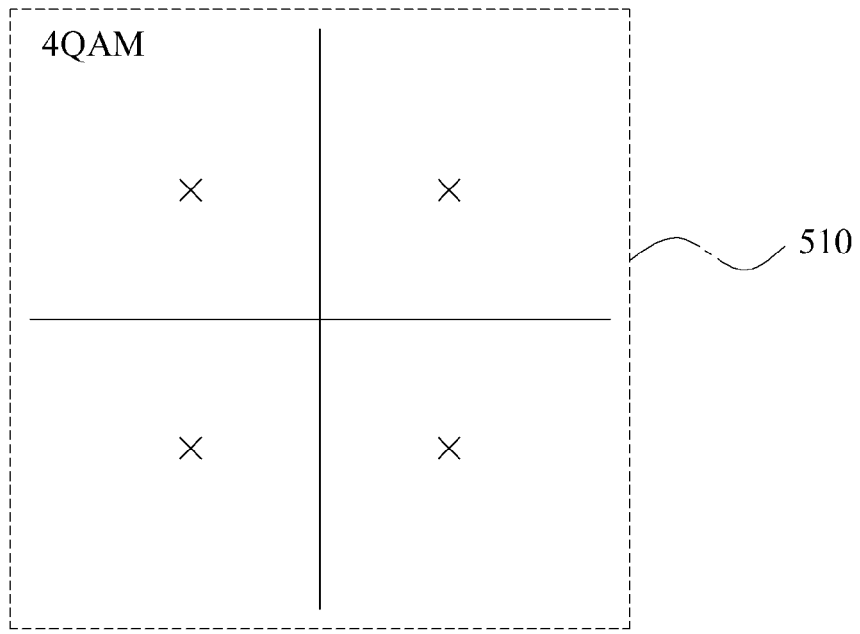
FIGS. 5A and 5B illustrate a constellation diagram of symbols in which a transmission signal is modulated according to an exemplary embodiment.
Figure 5B:
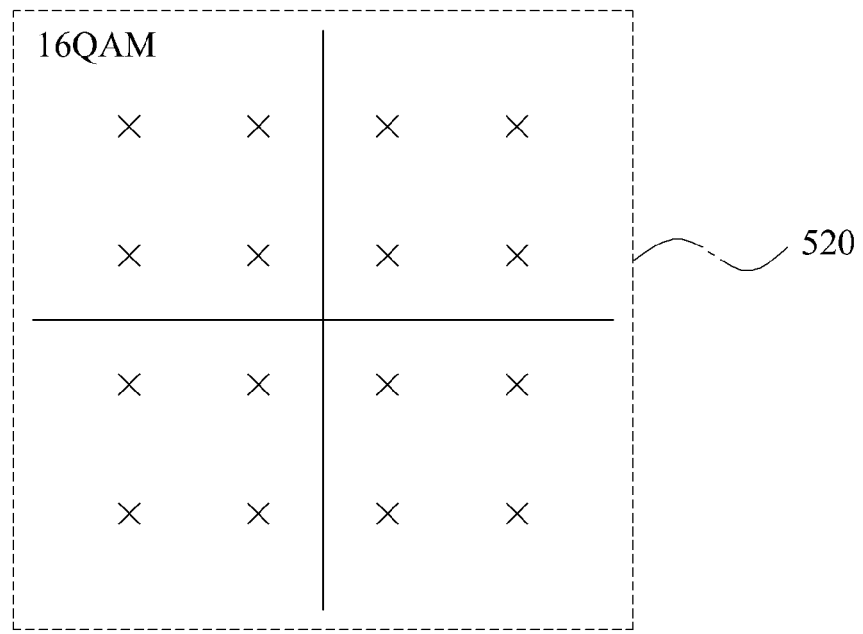

FIGS. 5A and 5B illustrate a constellation diagram of symbols in which a transmission signal is modulated according to an exemplary embodiment.

Referring to FIGS. 5A and 5B, a constellation diagram 510 is a case where a base station modulates a transmission signal to 4 QAM, and a constellation diagram 520 is a case where the base station modulates the transmission signal to 16 QAM. It is only an example and thus the embodiments disclosed herein are not limited thereto.

Initially, a process of determining, by a terminal, a modulation order will be described based on the constellation diagram where the base station modulates the transmission signal to 4 QAM.

Where the transmission signal is modulated to 4 QAM, respective two bits of the transmission signal may constitute a single symbol whereby the transmission signal may be transmitted to the terminal via a single antenna of the base station. Since respective two bits of the transmission signal constitutes the single symbol, a total number of types of transmission symbols may be four according to 2×2=4. Therefore, the transmission symbols may be mapped into four constellation types on the constellation diagram. Generally, in the case of 4 QAM, the transmission symbol may be mapped on the constellation diagram according to the above Equation 3. Here, d may be $\sqrt{2}$. Accordingly, the minimum squared Euclidian distance between symbols mapped on the constellation diagram may be 2. Where the modulation scheme is 4 QAM, a reference value is 2. Therefore, where the minimum squared Euclidian distance between the calculated transmission symbols is near to the reference value 2, the terminal may determine, as 4, the modulation order that the base station modulates the transmission signal.

Similarly, hereinafter, a process of determining, by the terminal, the modulation order will be described based on the constellation diagram 520 where the base station modulates the transmission signal to 16 QAM.

Where the transmission signal is modulated to 16 QAM, respective four bits of the transmission signal may constitute a single symbol whereby the transmission signal may be transmitted to the terminal via a single antenna of the base station. Since respective four bits of the transmission signal constitutes the single symbol, a total number of types of transmission symbols may be 16 according to 2×2×2×2=16. Therefore, the transmission symbols may be mapped into 16 constellation types on the constellation diagram. Generally, in the case of 16 QAM, the transmission symbol may be mapped on the constellation diagram according to the above Equation 3. Here, d may be $\sqrt{10}$. Accordingly, the minimum squared Euclidian distance between symbols mapped on the constellation diagram may be 0.4. Where the modulation scheme is 16 QAM, a reference value is 0.4. Therefore, where the minimum squared Euclidian distance between the calculated transmission symbols is near to the reference value 0.4, the terminal may determine, as 16, the modulation order that the base station modulates the transmission signal.

FIG. 6 illustrates a configuration of a base station 610 according to an exemplary embodiment.

As illustrated in FIG. 6, the base station 610 and a terminal 620 may be provided in a MIMO communication system.

The base station 610 comprises a signal modulator 611 and a signal transmitter 612.

The signal modulator 611 may adaptively modulate a transmission signal to be transmitted to the terminal 620 based on a channel state of a channel that is formed between the base station 610 and the terminal 620. According to an aspect, the signal modulator 611 may adaptively modulate the transmission signal to 4 QAM, 16 QAM, or 64 QAM.

The signal transmitter 612 may transmit the modulated signal to the terminal 620.

The terminal 620 may receive the modulated signal and extract at least one singular value of a channel matrix associated with the cannel formed between the base station 610 and the terminal 620. The terminal 620 may determine a modulation order and then demodulate the modulated signal based on the determined modulation order.

Figure 7:
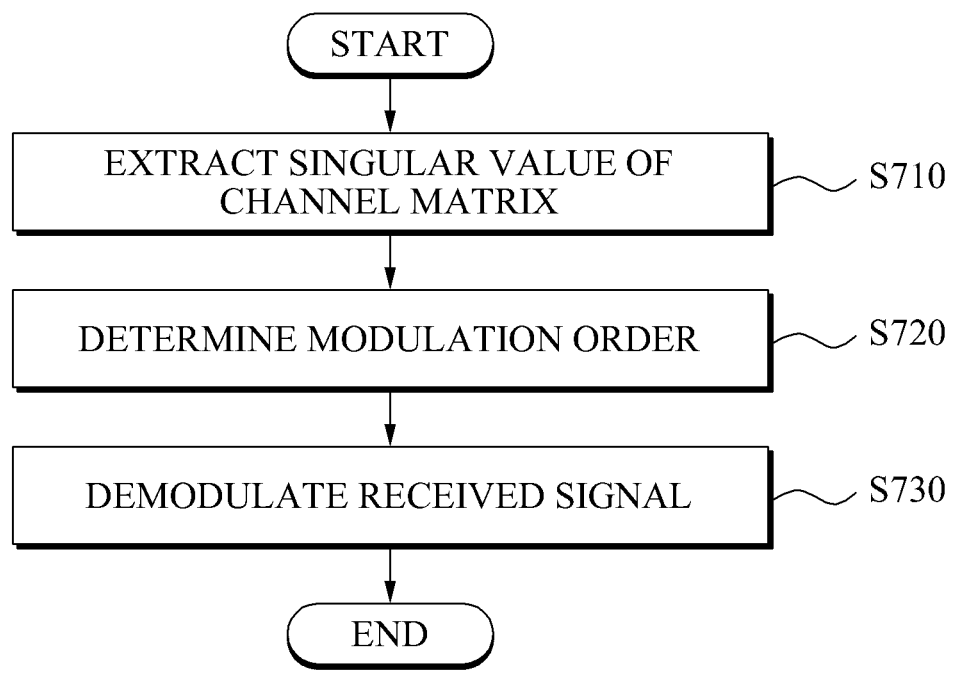
FIG. 7 is a flowchart illustrating a method of demodulating a received signal at a terminal according to an exemplary embodiment.

FIG. 7 is a flowchart illustrating a method of demodulating a received signal at a base station according to an exemplary embodiment.

The method comprises performing an SVD for a channel matrix associated with a channel that is formed between the base station and a terminal to extract at least one singular value of the channel matrix in operation S710.

The method may further comprise determining a modulation order based on the extracted at least one singular value in operation S720. Hereinafter, the operation S720 will be further described with reference to FIG. 8

Figure 8:
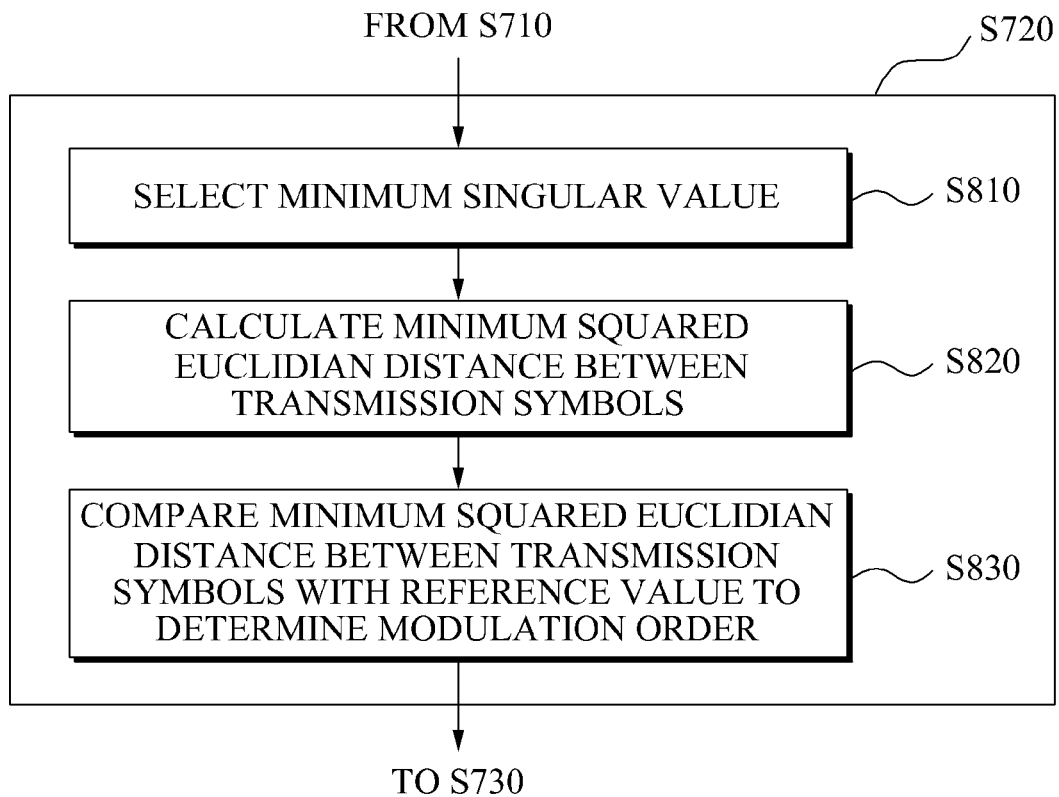
FIG. 8 is a flowchart illustrating an operation of determining a modulation order according to an exemplary embodiment.

FIG. 8 is a flowchart illustrating the operation S720 of determining the modulation order according to an exemplary embodiment.

The determining of the modulation order may comprise selecting a minimum singular value from the extracted at least one singular value in operation S810. A singular value satisfying the above Equation 6 may be the minimum singular value of the channel matrix.

The determining of the modulation order may further comprise calculating the minimum squared Euclidian distance between at least two received symbols with the different minimum Euclidian distance interval, based on the above Equation 4, in operation S820. The method may obtain the quotient by dividing the minimum squared Euclidian distance between the received symbols by the square of the selected minimum singular value. The obtained quotient may be the minimum squared Euclidian distance between transmission symbols shown in the above Equation 5.

The determining of the modulation order may further comprise comparing the calculated minimum squared Euclidian distance between the transmission symbols with a reference value to determine the modulation order in operation S830. Here, the reference value may denote the minimum squared Euclidian distance between transmission symbols for each modulation order shown in the above Equation 3.

Referring again to FIG. 7, the method of demodulating the received signal may further comprise demodulating the received signal based on the determined modulation order. Hereinafter, the operation S730 will be further described with reference to FIG. 9.

Figure 9:
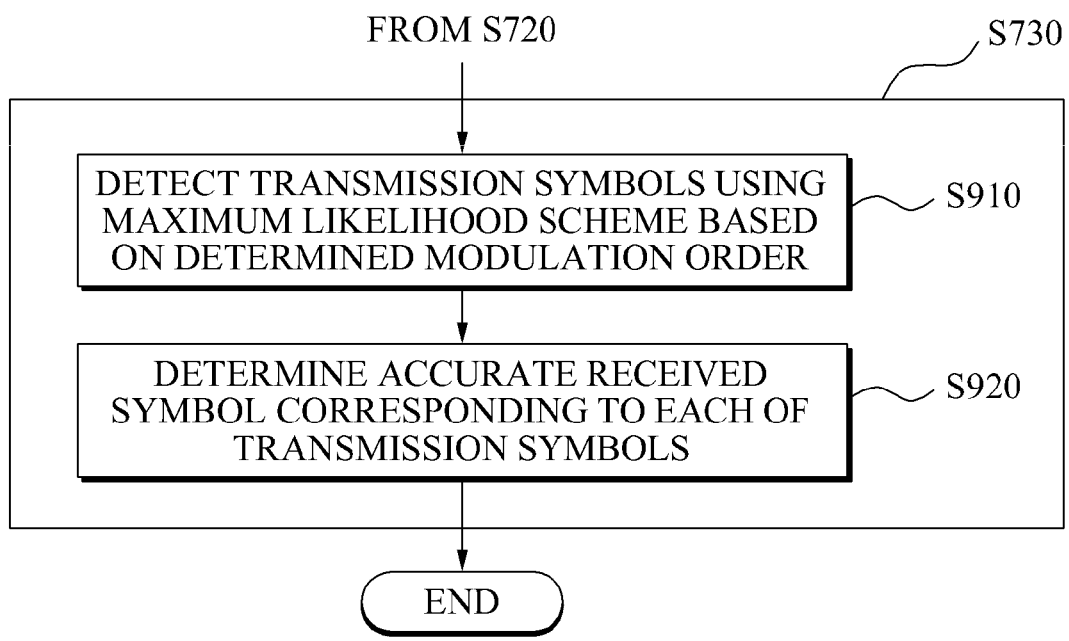
FIG. 9 is a flowchart illustrating an operation of demodulating a received signal according to an exemplary embodiment.

FIG. 9 is a flowchart illustrating the operation S730 of demodulating the received signal according to an exemplary embodiment.

The demodulating of the received signal may comprise detecting transmission symbols corresponding to received symbols using a maximum likelihood scheme, based on the determined modulation order in operation S910. The maximum likelihood may be represented as the above Equation 7. In the operation S910, a transmission symbol may be detected using the above Equation 7.

The demodulating of the received signal may further comprise an operation S920, in which where the transmission symbol errorlessly passes through the channel, for example, the received symbol determination unit 412 may determine an accurately received symbol that may be received by a terminal, based on the detected transmission symbol.

The methods described above may be recorded, stored, or fixed in one or more computer-readable media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A terminal comprising:
a singular value extractor configured to extract at least one singular value of a channel matrix associated with a channel that is formed between a base station and the terminal;
a singular value selector configured to select a minimum singular value from the at least one singular value;
a distance calculator configured to calculate a Euclidian distance between at least two transmission symbols based on a Euclidian distance between at least two received symbols and the selected minimum singular value, wherein the at least two received symbols are different from each other;
a determination unit configured to generate a comparison value indicating an outcome of a comparison of the Euclidian distance between the at least two transmission symbols with a reference value;
a modulation order determination unit configured to determine a modulation order based on the comparison value; and
a received signal demodulator to demodulate a received signal according to the determined modulation order.

2. The terminal of claim 1, wherein the at least two received symbols are symbols with a minimum Euclidian distance interval.

3. The terminal of claim 2, wherein the distance calculator divides a minimum squared Euclidian distance between the at least two received symbols by the square of the minimum singular value to calculate a minimum squared Euclidian distance between the at least two transmission symbols.

4. The terminal of claim 1, wherein the received signal from base station is a signal transmitted using an adaptive modulation scheme.

5. The terminal of claim 1, wherein the received signal demodulator comprises:
a transmission symbol detector configured to detect transmission symbols corresponding to received symbols using a maximum likelihood scheme, based on the determined modulation order; and
a received symbol determination unit configured to determine an accurate received symbol corresponding to each of the detected transmission symbols.

6. The terminal of claim 1, wherein the terminal communicates with the base station in a multiple-input multiple-output (MIMO) communication system.

7. A method of demodulating a received signal by a terminal, the method comprising:
extracting, via a singular value extractor, at least one singular value of a channel matrix associated with a channel that is formed between a base station and the terminal;
selecting a minimum singular value from the at least one singular value;
calculating a Euclidian distance between at least two transmission symbols based on a Euclidian distance between at least two received symbols and the minimum singular value, wherein the at least two received symbols are different from each other;
generating a comparison value indicating an outcome of a comparison of the Euclidian distance between the at least two transmission symbols with a reference value;
determining, via a modulation order determination unit, a modulation order based on the comparison value; and
demodulating, via a received signal demodulator, the received signal according to the determined modulation order.

8. The method of claim 7, wherein the at least two received symbols are symbols with a minimum Euclidian distance interval.

9. The method of claim 8, wherein the calculating of the Euclidian distance comprises dividing a minimum squared Euclidian distance between the at least two received symbols by the square of the minimum singular value to calculate a minimum squared Euclidian distance between the at least two transmission symbols.

10. The method of claim 7, wherein the received signal from the base station is a signal transmitted using an adaptive modulation scheme.

11. The method of claim 7, wherein the demodulating of the received signal comprises:
detecting transmission symbols corresponding to received symbols using a maximum likelihood scheme, based on the determined modulation order; and determining an accurate received symbol corresponding to each of the detected transmission symbols.

12. The method of claim 7, wherein the terminal communicates with the base station in a multiple-input multiple-output (MIMO) communication system.

13. A non-transitory computer-readable storage medium storing a program to demodulate a received signal, the program comprising instructions to cause a computer to:

extract at least one singular value of a channel matrix associated with a channel that is formed between a base station and a terminal;

select a minimum singular value from the at least one singular value;

calculate a Euclidian distance between at least two transmission symbols based on a Euclidian distance between at least two received symbols and the minimum singular value, wherein the at least two received symbols are different from each other;

generate a comparison value indicating an outcome of a comparison of the Euclidian distance between the at least two transmission symbols with a reference value;

determine a modulation order based on the comparison value; and demodulate the received signal according to the determined modulation order.

* * * * *